May 5, 1936.   H. E. McCORMACK   2,039,545
LINK SAUSAGE HEATER
Filed March 8, 1934
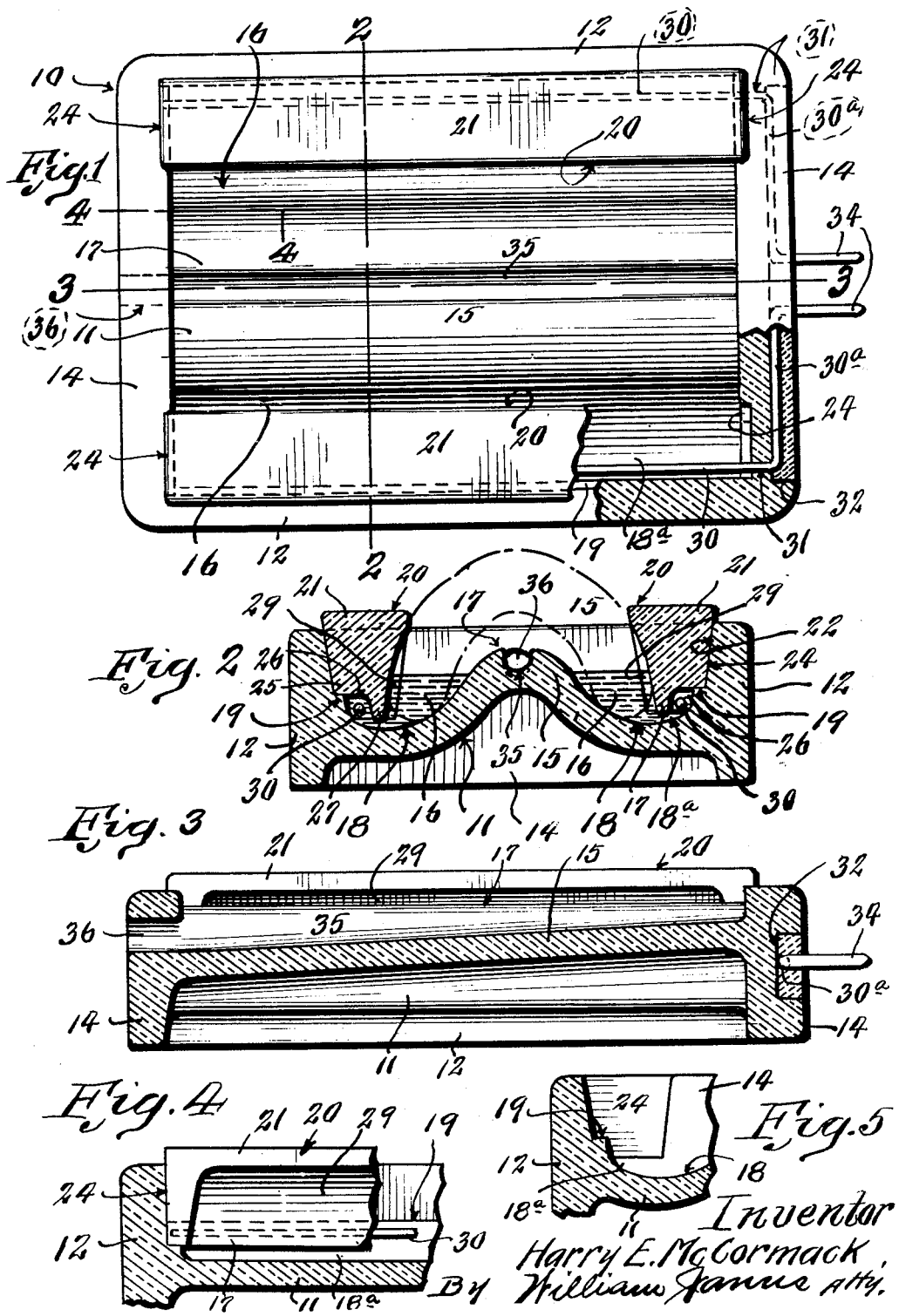
Inventor
Harry E. McCormack,
By William Janne Atty.

Patented May 5, 1936

2,039,545

UNITED STATES PATENT OFFICE 2,039,545

LINK SAUSAGE HEATER

Harry E. McCormack, St. Louis, Mo.

Application March 8, 1934, Serial No. 714,579

9 Claims. (Cl. 219—19)

This invention relates to link sausage heaters.

The objects of the present invention are to provide a sausage heater in which the electrodes are so located that they cannot come in contact with the sausage and the electrical connection is completed by the electrolyte or liquid in which the electrodes and the ends of the sausage are submerged.

Another object of the invention is to provide a link sausage heater comprising a member formed of porcelain, glass or other suitable insulation material and provided with a pair of spaced-apart troughs, each having its outer side formed with an overhanging portion for engaging the sausage and retaining the ends thereof in the respective troughs, each of the latter being provided with a longitudinally disposed recess for containing the electrode remotely from the sausage so that the latter cannot come in contact therewith and depends on the electrolyte or liquid contained in each trough to complete the electric circuit between the electrode and the sausage.

Further objects of the invention are to provide a sausage heater of the class described in which the troughs are separated from each other by a raised portion, said raised portion being provided with one or more longitudinally disposed grooves or drain troughs through which the surplus electrolyte or liquid is drained, thereby preventing short-circuiting of the electrolyte contained in the troughs.

Additional objects of the invention are to provide a link sausage heater which is of simple construction and is highly efficient in operation and in which the electric current is supplied to the ends of the sausage by means of the electrolyte or liquid in which the ends of the sausage are submerged.

With these and other objects in view, my invention consists in certain novel features of construction and arrangement of parts, hereinafter more fully described and claimed, and illustrated in the accompanying drawing, in which—

Figure 1 is a top plan view partly in cross section.

Figure 2 is a transverse cross section taken on line 2—2 of Figure 1.

Figure 3 is a longitudinal cross section taken on line 3—3 of Figure 1.

Figure 4 is a fragmental sectional view taken on line 4—4 of Figure 1.

Figure 5 is a detail fragmental section of the trough member showing the pocket for receiving the end of the block.

Referring by numerals to the accompanying drawing, 10 indicates a trough or bowl member comprising a bottom wall 11, side walls 12, and end walls 14. The bottom wall 11 is provided with a centrally disposed longitudinal rib or raised portion 15 which divides said bowl into two containers or troughs 16. Preferably this central portion 15 is curved transversely, as shown in Figure 3, and the crown 17 of said raised portion is disposed a suitable distance below the horizontal plane of the upper edges of said walls 11 and 12. The bottom 18 of each trough is curved transversely and merges with the oppositely curved surface of the central portion 15.

Adjacent to each side wall 12 each trough 16 is formed with a longitudinally disposed upwardly presented shoulder 19 arranged a suitable distance above the lowermost portion 18a of bottom 18.

The sausage is placed in position by inserting the ends thereof in the respective troughs or compartments 16. The distance between the troughs is less than the distance between the ends of the sausage so that the latter has to be flexed or pressed together to enable the insertion of the ends thereof in position. In order to maintain the sausage in flexed position, each trough 16 is provided on its outer side with an overhanging or inward projection 20 against which the ends of the sausage press.

In the form shown in Figures 1 to 3, these overhanging projections are formed integral with blocks 21 which are made separate from bowl 10 and are secured in position therein.

As shown, each block has a straight outer side wall 22 which fits against the inner face of each side wall 12. The end walls 14 are provided with pockets 24 (see Fig. 5) into which the ends of the blocks 21 fit. Each block has its bottom formed with a straight longitudinally disposed portion 25 adjacent to the outer wall 22 and a downwardly presented longitudinally disposed groove or recess 26 terminating in a downwardly presented rib 27.

When the blocks 21 are in position, portions 25 rest on the shoulders 19 and rib 27 of each block terminates adjacent to but is spaced from the bottom 18. Thus the oppositely curved portions 18a of bottom 18 and 26 of block 21 form a chamber 28 which is closed on all sides with the exception of the clearance existing between rib 27 and bottom 18.

The inner side of each block 21 is concave and curves inwardly and upwardly, as at 29, so that the inner upper edge of each block overhangs the trough, thereby forming a sausage retaining projection 20.

An electrode 30 is arranged in each chamber 28. One end of each electrode extends through the aperture 31 formed in the corresponding end wall 11 in alignment with said chamber 28. The outer side or face of said apertured end wall is provided with a horizontally disposed elongated recess or groove 32 which extends between said apertures 31. The projecting portion of each electrode is bent at right angle as at 32a and occupies the corresponding half of recess 32. The ends of the electrodes are bent at right angle to portions 30a and extend outwardly from recess 32 in parallel spaced relation with each other to form terminals 34.

When the electrodes are in place, the apertures 31 and recess 32 are filled with suitable cementitious substance or other sealing compound which is water-proof and seals said apertures and securely holds the electrodes in place. Preferably, blocks 21 are also cemented in place.

The troughs 16 are filled with water or other suitable electrolyte, such as a saline solution, to a level sufficient to submerge completely the electrodes 30 but a suitable distance below the ridge 15. When a link sausage such as a frankfurter, is placed in position, the ends thereof are submerged in the electrolyte contained in the troughs. However, the sausage cannot come in contact with the electrodes 30 due to the fact that the latter are contained in chambers 28, the access to which is closed by the ribs 27 so that only the electrolyte can enter said chambers 28.

The electrodes 30 are connected to the supply lines by the usual flexible cord connection commonly used in conjunction with electric cooking appliances and having the usual plug for detachably engaging terminals 34.

The raised portion 15 prevents water from spilling from one compartment or trough into the other, thereby eliminating the possibility of short-circuiting the device. If the sausage is excessively heated, the middle portion thereof will burst, causing juice to drip and run down the sloping sides of portion 15. In order to eliminate the danger of short-circuiting from this and other causes the crown or top 17 of said portion 15 is formed with a longitudinally disposed channel or trough 35 which extends the full length of portion 15 and forms a break in the continuity of the surface thereof. This channel is inclined from horizontal and at its lower end it opens into a drain aperture or discharge opening 36 formed in one of the end walls 14. Preferably this drain opening is located in the opposite end from that in which terminals 34 are located. The drain channel 35 and drain opening 36 form an overflow through which excess liquid is drained in case the level of the liquid in the trough is raised too high.

Any suitable liquid or electrolyte can be used in trough 16 but saline solution is preferred as it reduces the resistance offered to the electrical current and does not affect the sausage.

As shown, each electrode is made of a single length of metal rod of suitable diameter bent to provide the electrode portion, the intermediate portion 32a and the terminals 34. The rod is preferably of aluminum as it is not affected by the salt solution.

When the electrodes 30 are in place, the outer or free end of each electrode rests in the lower end of the corresponding pocket 24. Blocks 21 are preferably formed separate from members 10 for convenience in manufacture; however, they can be formed integral with the base member 10 if so desired. The blocks 21, being engaged by the ends of the link sausage, prevent the end of the sausage from extending or projecting into contact with the electrodes. The depending ribs 27 provide additional protection and eliminate all danger of direct contact between the electrodes and the sausage. The liquid used in troughs 16 not only serves to establish electrical connection between the electrodes and the sausage ends but also keeps the latter cool and moist so that they do not become dry and unappetizing. In case the liquid boils out or is drained from the device, the electrical circuit is automatically broken. The raised portion 15 and blocks 21 provide protective means which prevent an object, such as a knife or a fork, from accidentally dropping into both of said troughs and causing short-circuiting.

While I have shown and described herein the preferred form of my invention, it is obvious that various changes in the construction of my device may be made and substituted for those herein shown without departing from the spirit of my invention.

I claim:

1. A link sausage cooking appliance comprising a base member, a pair of spaced-apart receptacles arranged therein in insulated relation with each other and adapted to receive the ends of a sausage disposed between and bridging said receptacles, each receptacle being provided with a recess inaccessible to the sausage end, and an electrode arranged in each recess and held out of contact with the sausage, whereby electrical connection between the electrode and the sausage end is established by suitable liquid contained in said receptacles.

2. A link sausage heater comprising a member of insulation material provided with a pair of laterally spaced-apart troughs adapted to receive suitable liquid, said troughs being separated from each other by a raised portion having a longitudinally disposed drain channel terminating at one end in a drain opening, said troughs being adapted to receive each one end of a link sausage when the latter is placed between said troughs, and an electrode arranged in a remote portion in each trough, said electrode and said sausage end being submerged in the liquid contained in said trough whereby electrical connection is established therebetween by said liquid only.

3. A device of the class described comprising a member of insulation material having formed therein a pair of spaced-apart troughs adapted to receive the ends of a link sausage placed transversely between said troughs, each trough being arranged to receive a suitable liquid in which the ends of said sausage are submerged, an electrode arranged in each trough adjacent to the outer side thereof and submerged in the liquid contained therein, and a longitudinally disposed block arranged in each trough adjacent to the outer side thereof above the corresponding electrode, each block being provided with a downward extension which separates said electrode from the remaining portion of said trough and prevents direct contact between said electrode and the sausage end inserted in said trough whereby electrical connection can be accomplished only by the liquid contained in said trough.

4. A link sausage heater comprising a member of insulation material having a pair of spaced-apart troughs formed therein and each containing a suitable liquid, said troughs being adapted to receive the ends of a sausage placed between said troughs, each trough being provided in its bottom with a recess, an electrode arranged in said recess, and means arranged in each trough for rendering said electrode inaccessible to the sausage end placed in said trough whereby electrical connection can be established between said electrode and the sausage end only by the liquid contained in the trough.

5. A link sausage heater comprising a member of insulation material provided with a pair of laterally spaced-apart troughs, each being adapted to receive one end of a link sausage extending between and bridging said troughs, there being a raised portion formed on said member between said troughs and coextensive therewith, the top of said portion being formed with a drain channel having a drain opening separate from said troughs, and an electrode arranged in each trough, each trough being adapted to receive suitable electrolyte which completely covers said electrode and said sausage end.

6. A link sausage heater comprising a member of insulation material provided with a pair of laterally spaced-apart troughs, each being adapted to receive one end of a link sausage placed between and bridging said troughs, there being a raised portion formed on said member between said troughs and coextensive therewith, the top of said portion being formed with a drain channel having a drain opening separate from said troughs, an electrode arranged in each trough, each trough being adapted to receive suitable electrolyte which completely covers said electrode and said sausage end, and means in each trough for separating the electrode from the sausage ends inserted in said trough.

7. In a device of the class described, the combination of a member having a pair of spaced-apart receptacles of insulation material, each receptacle containing a suitable electrolyte and adapted to receive one end of a link sausage, the length of which is greater than the distance between said receptacles, whereby said sausage is curved upwardly when the ends thereof are inserted in said receptacle, an electrode arranged in each receptacle, and means in each receptacle for preventing contact between said electrode and the sausage end inserted in the receptacle, whereby electrical connection is established only by the liquid contained in said receptacle.

8. In a device of the class described, the combination of a member having a pair of spaced-apart receptacles of insulation material, each being formed with a recess adjacent to the bottom thereof, each receptacle being filled with a suitable electrolyte and adapted to receive one end of a link sausage, said recess being so arranged as to be inaccessible to said sausage end, the distance between said receptacles being less than the length of the sausage whereby the latter is tensioned and curved upwardly when the ends thereof are inserted in said receptacles, and an electrode arranged in each recess for transmitting electrical current to said sausage end through the electrolyte contained in said receptacle.

9. In an electrical cooking appliance for link sausages, the combination of a member of insulation material having formed therein a pair of spaced-apart troughs, each being filled with a saline solution and adapted to receive one end of a link sausage, the distance between said troughs being less than the length of the sausage whereby when the ends of the latter are inserted in said troughs said sausage is caused to curve upwardly between and transversely of said trougs, and an electrode comprising a single piece of metal rod bent to form the electrode portion and an intermediate portion disposed at right angles thereto, each trough being formed with a recess inaccessible to the sausage end and adapted to receive said electrode portion, there being a groove formed in one of the end walls of said member for receiving one end of said intermediate portion extending outwardly from said groove to form a terminal for the electrode.

HARRY E. McCORMACK.